May 28, 1946.  M. J. LAUDAHL  2,401,084
TRAILER HITCH AND AUTOMATIC BRAKE ACTUATOR
Filed April 13, 1945
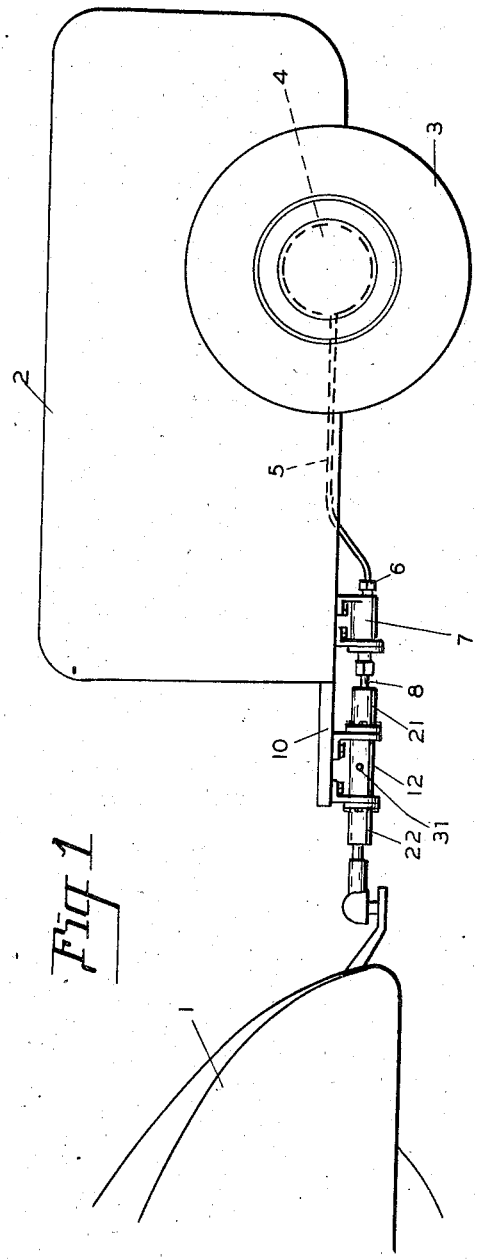
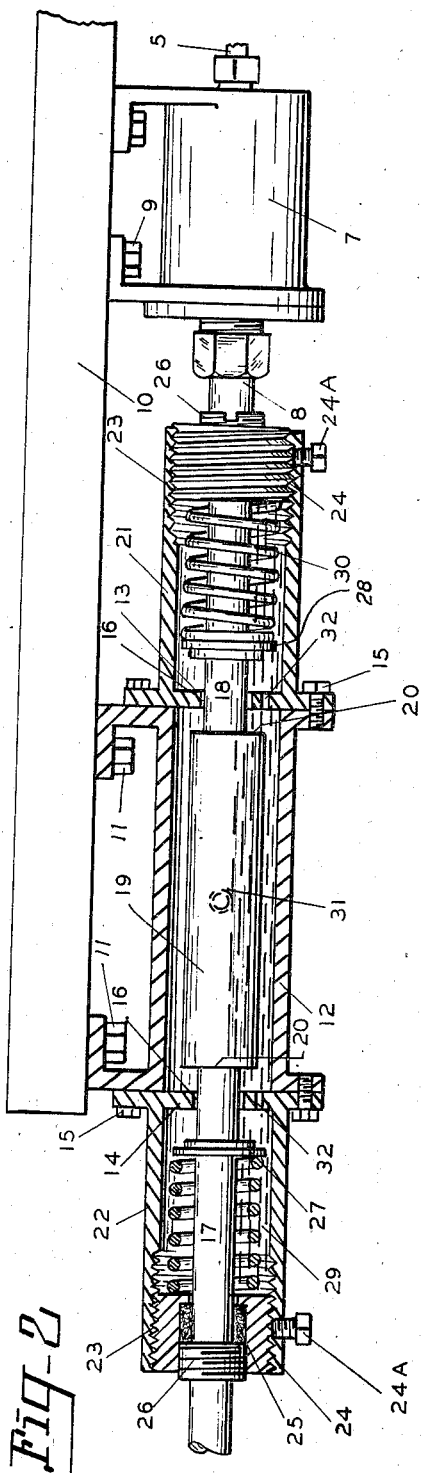
MARK JAMES LAUDAHL
INVENTOR.
BY Patented May 28, 1946

2,401,084

UNITED STATES PATENT OFFICE 2,401,084

TRAILER HITCH AND AUTOMATIC BRAKE ACTUATOR

Mark James Laudahl, Portland, Oreg.

Application April 13, 1945, Serial No. 588,131

3 Claims. (Cl. 188—142)

This invention relates to improvements in trailer hitches especially adapted for use in connection with automobile and truck trailers.

The principal object of the invention is the provision of a yieldable coupling interconnecting the towing vehicle and trailer for automatically actuating the brakes of the trailer upon relative movement between the trailer and the towing vehicle when the brakes of the latter are applied and the trailer moves slightly forward.

These and other objects will appear as my invention is more fully hereinafter described in the following specification, illustrated in the accompanying drawing, and finally pointed out in the appended claims.

In the drawing:

Figure 1 illustrates a trailer attached to a towing car by means of a hitch and brake actuating mechanism made in accordance with my invention.

Figure 2 is an enlarged longitudinal sectional side elevation of a yieldable connection between the trailer and the towing vehicle and a conventional hydraulic brake master cylinder for actuating the brakes of the trailer.

Referring now more particularly to the drawing:

In Figure 1, reference numeral 1 indicates, generally, a towing vehicle which may be a passenger car, truck, motorcycle or any other vehicle which may be used for towing a trailer, generally indicated at 2, and which is provided with any usual number of wheels 3 rotatably mounted upon an axle 4 carried by the trailer in any approved or conventional manner. Each wheel of the trailer is provided with conventional hydraulic brakes (not shown) operable through a tube or oil line 5, connected as at 6, with a conventional hydraulic brake master cylinder 7 within which is slidably mounted a piston actuated by the shaft 8. As the piston moves rearwardly with respect to the cylinder 7 by the shaft 8, the brakes in the trailer wheels are applied, and as the piston is drawn forwardly in the opposite direction the trailer brakes are released.

The hydraulic brake cylinder 7 is secured by any suitable means such as bolts 9, or the like, to the underside of the tongue 10 of the trailer 2. Also secured, as at 11, to the underside of the trailer tongue and forward of the cylinder 7, is a cylindrical housing 12 having end walls 13 and 14 secured thereto as at 15. The end walls are formed with apertures 16 to form slidable bearings for the portions 17 and 18 of the shaft 8. That portion of the shaft 8, disposed within the cylindrical housing 12 and between the end walls 13 and 14, is enlarged as at 19 to form shoulder portions 20 to serve as limit stops for the movement of the housing in either a forward or rearward direction with respect to the towing vehicle.

Each end wall 13 and 14 of the cylinder 12 is formed with tubular extensions 21 and 22, respectively, and each is internally threaded as at 23 to receive an externally threaded bearing 24 provided with a packing gland 25 backed by a conventional packing nut 26. Attached to, or formed integral with the shaft 8, are collars 27 and 28. Interposed between these collars are compression springs 29 and 30, respectively, whose one end bears against the plug 24 and whose opposite end bears against the collars 27 or 28. Thus, as relative movement occurs between the shaft and the trailer tongue in either direction, the compression springs will tend to restore the shaft to a centralized or neutral position with respect to the housing 12.

When the towing vehicle is proceeding in a forward direction without its brakes applied and is exerting a direct pull on the trailer, the forward shoulder portion 20 of the enlarged portion 19 of the shaft 8 abuts the forward end wall 14 of the housing 12 and the pulling load is thereby transmitted from the shaft to the housing 12 and its connection to the trailer tongue. At this time the forward compression spring 29 is fully compressed by the forward movement of the shaft 8 through the medium of the collar 27 secured thereto. Thus, part of the pulling load is also transmitted to the forward end of the tubular extension 22. During this time the rearwardly disposed compression spring 30 is fully relaxed and the rearward shoulder portion 20 of the enlarged portion 19 of the shaft 8 has moved away from the end wall 13 of the cylindrical housing 12.

When the towing vehicle reduces its speed, either through the application of brakes, or running on compression, or otherwise, the trailer will, of course, move forward and therefore the conventional master cylinder 7, together with the cylindrical housing 12 and its forward and rearward extensions 21 and 22, will move forward with the trailer since they are carried by it as a unit. This forward movement of the trailer with respect to the towing vehicle causes the shaft 8 to thrust the piston within the master cylinder rearwardly to apply the brakes to the trailer and at the same time the end wall 13 of the cylindrical housing 12 is brought into abutment with the rearward shoulder portion 20 of the enlargement 19 of the shaft 8. At the same time, the rearwardly disposed compression spring 30 is fully compressed against the plug 24 within the tubular extension 21 through the medium of the collar 28 secured to said shaft. Each spring is calculated to become fully compressed at the same time its respective shoulder portion comes into contact with said end walls.

Both end plugs 24 are adjustable lengthwise of their threaded connections with the tubular extensions 21 and 22 for applying variable degrees of compression to the compression springs 29 and 30 and may be locked in any adjusting position by set screws 24, or the like.

Through the medium of this adjusting means, it will be apparent that in some instances the compression springs may take up and carry the pulling or braking load without the shouldered portions 20 of the enlargement 19 on the shaft 8 coming into contact with either end wall. The shock absorbing effect produced by these adjustable springs provides for a smoother and quieter operation by preventing the shouldered portions 20 from coming into violent contact with the end walls of the cylindrical housing 12.

It is to be understood that the rearward compression spring 30 should never be completely compressed by the advancement of the plug 24 upon its threads in the housing 21, since this would obviously lock the shaft 8 against any relative rearward movement and at the same time the forward shouldered portion 20 of the enlargement 19 of the shaft 8 would be in permanent abutment with the end wall 14 of the cylindrical housing 12 and no braking action would result. For best operating results, the amount of compression applied to both compression springs 29 and 30 should be equal for the purpose of centralizing or returning to a central position the enlarged portion 19 of the shaft 8 within the cylindrical housing when no load is applied in either direction.

To provide proper lubrication for the shaft 8, cylindrical housing 12, and their related parts, I provide a filling aperture 31 provided with a closure plug for admitting oil to the interior of the cylindrical housing and the tubular extensions 21 and 22. The filling aperture is preferably disposed on either side of the cylindrical housing 12 to prevent the housing and the tubular extensions from becoming filled to their capacity. To enable the oil to flow freely from end to end of the mechanism, I provide oil passage ways 32 through both end walls 13 and 14.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

1. A trailer hitch consisting of a cylindrical housing secured to the tongue of a trailer, cylindrical extensions secured to said housing and extending forwardly and rearwardly therefrom, a braking mechanism disposed rearwardly of said housing and also secured to said tongue, a shaft extending through the housing and cylindrical extensions, the forward end of said shaft connecting with a towing vehicle and the rearward end of said shaft extending into operative engagement with the braking mechanism for actuating the same, the portion of said shaft disposed within said cylindrical housing being enlarged to form shoulder portions for abutment with the end walls of said housing, and resilient means disposed within each of said cylindrical extensions for yieldingly resisting the relative movement between said shaft housing and cylindrical extensions.

2. A trailer hitch consisting of a cylindrical housing secured to the tongue of a trailer, cylindrical extensions secured to said housing and extending forwardly and rearwardly therefrom, a hydraulic cylinder disposed rearwardly of said housing and also secured to said tongue, a shaft extending through the housing and cylindrical extensions, the forward end of said shaft connecting with a towing vehicle and the rearward end of said shaft extending into said brake cylinder for actuating the same, the portion of said shaft disposed within said cylindrical housing being enlarged to form shoulder portions for abutment with the end walls of said housing, and resilient means disposed within each of said cylindrical extensions for yieldingly resisting the relative movement between said shaft housing and cylindrical extensions, and means carried by said cylindrical extensions for regulating the resistance of said yieldable means.

3. A trailer hitch consisting of a cylindrical housing attached to the tongue of a trailer and having cylindrical extensions secured to the forward and rearward ends thereof, a hydraulic brake cylinder disposed rearwardly of said rearward cylindrical extensions and secured to said tongue of the trailer, said trailer having idling wheels provided with brakes actuated by said hydraulic brake cylinder, a shaft extending through the cylindrical housing and said cylindrical extensions and connected at its forward end with a towing vehicle at its opposite end extending into operative engagement with said hydraulic brake cylinder, resilient means in the form of compression springs disposed within each of said cylindrical extensions for yieldingly resisting relative movement between the trailer and said towing vehicle, closure plugs adjustably mounted within the outer-most ends of said cylindrical extensions for regulating said compression means, a lubricant disposed within said cylindrical housing and the cylindrical extensions, and passage ways between said cylindrical housing and said cylindrical extensions for enabling said lubricant to flow from one extreme end of one cylindrical extension through said housing to the other end of said cylindrical extensions.

MARK JAMES LAUDAHL.